United States Patent [19]
Gillian et al.

[11] Patent Number: 5,861,931
[45] Date of Patent: Jan. 19, 1999

[54] PATTERNED POLARIZATION-ROTATING OPTICAL ELEMENT AND METHOD OF MAKING THE SAME, AND 3D DISPLAY

[75] Inventors: Margaret Davis Gillian, Cambridge; Martin David Tillin, Oxfordshire, both of United Kingdom

[73] Assignee: Sharp Kabushiki Kaisha, Osaka, Japan

[21] Appl. No.: 727,970

[22] Filed: Oct. 9, 1996

[30] Foreign Application Priority Data

Oct. 13, 1995 [GB] United Kingdom .................. 9521035

[51] Int. Cl.$^6$ .................. G02F 1/1337; G02F 1/1335
[52] U.S. Cl. ..................... 349/129; 349/15; 349/124; 349/191
[58] Field of Search .................. 349/15, 129, 128, 349/124, 191

[56] References Cited

U.S. PATENT DOCUMENTS

| | | | |
|---|---|---|---|
| 5,096,520 | 3/1992 | Fasis | 349/15 |
| 5,235,449 | 8/1993 | Imazeki et al. | 359/63 |
| 5,264,964 | 11/1993 | Faris | 359/465 |
| 5,327,285 | 7/1994 | Faris | 359/483 |
| 5,389,698 | 2/1995 | Chigrinov et al. | 359/75 |
| 5,537,144 | 7/1996 | Faris | 359/465 |
| 5,594,570 | 1/1997 | Hirata et al. | 349/129 |
| 5,638,201 | 6/1997 | Bos et al. | 349/129 |

FOREIGN PATENT DOCUMENTS

| | | |
|---|---|---|
| 0397263 | 11/1990 | European Pat. Off. . |
| 0445629 | 9/1991 | European Pat. Off. . |
| 0457607 | 11/1991 | European Pat. Off. . |
| 63-158525 | 7/1988 | Japan . |
| 0489888 | 8/1938 | United Kingdom . |
| 0570983 | 8/1945 | United Kingdom . |
| 0771074 | 3/1957 | United Kingdom . |
| 0936788 | 9/1963 | United Kingdom . |
| 1002999 | 9/1965 | United Kingdom . |
| 22886058 | 8/1995 | United Kingdom . |

OTHER PUBLICATIONS

European Search report dated Apr. 7, 1998 corresponding to European Patent Application No. 96307735.8.

Schadt M. et al.; "Photo–Generation of Linearly Polymerized Liquid Crystal Aligning Layers Comprising Novel, Integrated Optically Patterned Retarned and Color Filters" Japanese Journal of Applied Physics, vol. 34, No. 6A, Jun. 1, 1995, pp. 3240–3249.

Schadt M. et al.; "Photo–Induced Alignment and Patterning of Hybrid Liquid Crystallinepolymer Films on Single Substrates" Japanese Journal of Aplied Physics, vol. 34, No. 6B, Jun. 15, 1995, pp. L764–L767.

Kaneko T. et al.; "Liquid Crystal Polarization Rotator: Optical Element for Intermodulation Spatial–Bandwidth Reduction in Holography", Optics Communications, vol. 32, No. 2, Feb. 1, 1980, pp. 220–224.

Bahadur, B.; "Liquid Crystals–Applications and Uses"; 1990, World Scientific, Singapore, pp. 232–234.

M. Tani et al, SID, Oct. 10–13, pp. 103–111, 1994, "Progress in Color Filters for LCDs".

VRex Inc., 1993, "SMUX SOFTWARE–3–D Stereoscopic Image Converson".

J.L. West et al., SID 95 Digest, pp. 703–705, 1995, "31.3: Polarized UV–Exposed Polyimide Films for Liquid Crystal Alignment".

M. Schadt et al., Jpn. J. Appl. Phys., vol. 31, pp. 2155–2164, 1992, "Surface–induced Parallel Alignment of Liquid Crystals by Linearly Polymerized Photolymers".

E.H. Land, J. O. S. A., vol. 30, pp. 230–238, 1940, "Vectographs; images in Terms of Vectorial Inequality and Their Application in Three–Dimensional Representation".

Primary Examiner—Anita Pellman Gross

[57] ABSTRACT

A patterned polarization-rotating optical element includes a layer of birefringent material having a thickness d and birefringence $\Delta n$, wherein the layer includes at least one first region and at least one second region, at least one of the first and second regions comprising twisted birefringent material having a fixed twist angle $\phi$ such that $\Delta n \cdot d >> \phi \cdot \lambda/\pi$, where $\lambda$ is a wavelength in vacuum of optical radiation, so that the at least one first region provides a first fixed angle of rotation of polarization of light and the at least one second region provides a second fixed angle of rotation of polarization of light, the second angle being different from the first fixed angle.

24 Claims, 5 Drawing Sheets

PATTERNED POLARIZATION-ROTATING OPTICAL ELEMENT AND METHOD OF MAKING THE SAME, AND 3D DISPLAY

The present invention relates to an optical element, to a method of making such an optical element, to an optical element made by such a method, and to a 3D display. Such an element may be used as a polarisation micro-manipulator, for instance in liquid crystal displays.

Uniform polarisers i.e. polarisers which provide polarisation of light which is spatially uniform or invariant, are well known. The conventional method of making such polarisers for operation at visible wavelengths involves stretching a sheet of polyvinyl alcohol (PVA) and dipping the sheet into iodine or dye to form a sheet with polarising properties resulting from the alignment of the light-absorbing iodine or dye molecules with the stretch direction of the PVA. Although such polarisers provide very high extinction ratios and are suitable for many applications, they suffer from limitations which prevent or make difficult their use in certain applications. For instance, PVA is a water soluble and fragile material which must be laminated between more robust layers before use. Consequently, although the PVA film may have a very small thickness, for instance of about 20 micrometers, the protection layers substantially add to the overall thickness, typically to about 100 micrometers. Further, iodine has a boiling point of 183 degrees centigrade, which makes incorporation inside liquid crystal displays (LCD) difficult because of the temperatures involved during LCD manufacture.

A more recent technique for making polarisers is disclosed in EP 397263 and is based on a liquid crystal diacrylate monomer or dimethacrylate monomer and a dichroic colorant oriented by contact with a rubbed surface and then polymerised by exposure to ultraviolet radiation. Polarisers made by this technique retain their orientation characteristics up to 350 degrees centigrade and survive assembly within a liquid crystal display.

Patterned polarisers, in which different regions have different directions of polarisation, are disclosed by E H Land, J. Opt. Moc. Am. 30, 230, 1940 and in JP 63-158525, U.S. Pat. No. 5,327,285, and U.S. Pat. No. 5,235,449. Such patterned polarisers can be made using the conventional PVA-iodine technique or more recent techniques, for instance based on polydiacetylene derivative as disclosed in U.S. Pat. No. 5,235,449. Although suitable for many uses, for instance in three dimensional (3D) stereoscopic displays, such patterned polarisers are not ideal because the polarisation of transmitted light varies spatially. For instance, where it is required that the light from such a polariser impinge on an anisotropic device and the operation of such a device should function with spatial invariance, such a patterned polariser may not be used on its own.

EP 457607 discloses a uniform optical polarization rotator which rotates the direction of polarisation of light through a fixed angle i.e. by an angle which is spatially invariant. Polarisation rotation is achieved by the use of a uniform twisted nematic liquid crystal polymer film whose thickness and birefringence are such that guiding of the polarisation state takes place due to the Mauguin effect across the visible spectrum. Such a rotator is advantageous compared with typical half wave retarders in that it is effective over a wider bandwidth. However, the polarisation rotator disclosed in EP 0 457 607 is not patterned and cannot provide polarisation selection.

Patterned polarisers and patterned retarders are disclosed in GB 2286058, GB 1002999, GB 7710784, GB 570983, GB 489888, U.S. Pat. No. 5,389,698, JP 630158525 and EP 0445629.

GB 936788 discloses a polariser which is formed by means of a dichroic dye oriented by exposure to ultraviolet radiation.

According to a first aspect of the invention, there is provided an optical element as defined in the appended claim 1.

According, to a second aspect of the invention there is provided a method as defined in the appended claim 7.

Preferred embodiments of the invention are defined in the other appended claims.

It is thus possible to provide an optical element which is capable of use as a polarisation micromanipulator in which different regions provide different angles of rotation of polarisation. Such elements are capable of being used within LCDs and, in particular, can withstand the temperatures during LCD manufacture. Further, such elements may be sufficiently thin and may be incorporated within displays so as to reduce the effects of cross talk between picture elements (pixels) so as to reduce parallax errors. Such elements can function over a relatively wide bandwidth, for instance over the whole of the visible bandwidth. Further, it is possible to provide optical elements which can present light of uniform or spatially invariant polarisation from one side thereof, from a spatially variant polarisation distribution on the other side thereof, for instance so that such elements may be used with or in anisotropic optical devices.

The invention will be further described, by way of example, with reference to the accompanying drawings, in which.

Figure 1:
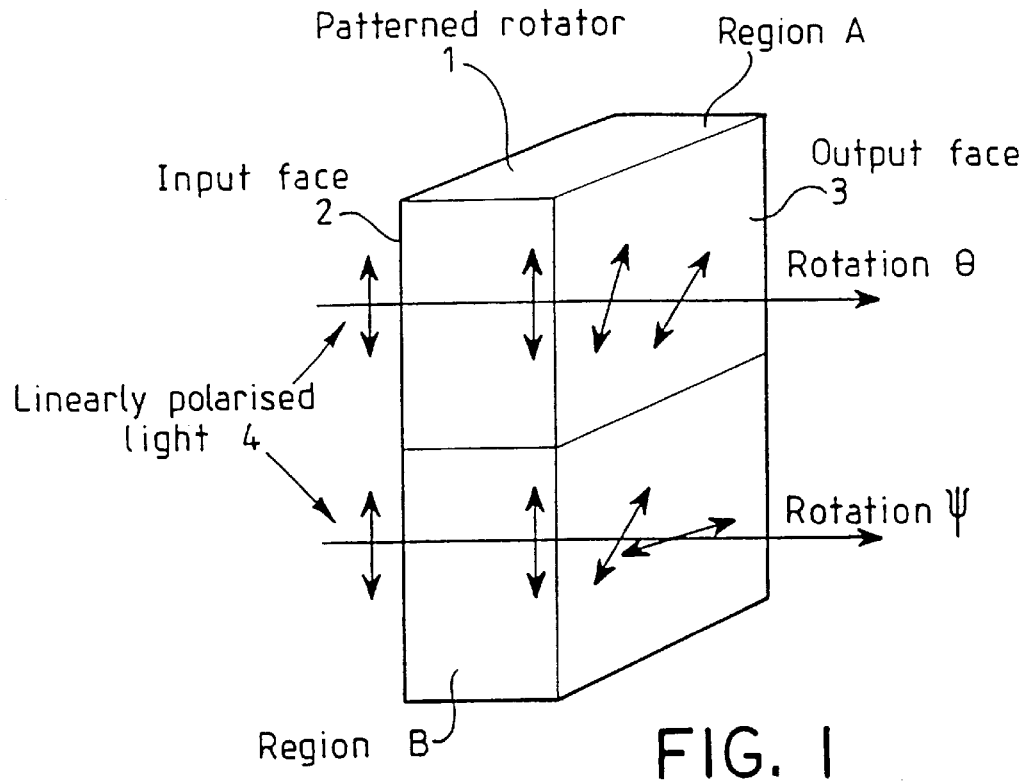
FIG. 1 is a diagrammatic view of an optical element constituting a first embodiment of the invention.

The optical element shown in FIG. 1 comprises a liquid crystal polymer patterned polarisation rotator thin film element. The element comprises a plurality of regions A and B (only one each of which are shown) arranged as a regular alternating array such that the regions A and B alternate vertically and horizontally. The rotator 1 has an input face 2 and an output face 3 and is made from a liquid crystal polymer which rotates the polarisation direction or vector of linearly polarised light 4. Each of the regions A rotates the polarisation vector by an angle θ whereas each of the regions B rotates the polarisation vector by an angle ψ.

The element is made from a film of birefringent material having a thickness d and a birefringence Δn. Those regions which rotate the polarisation vector have a twisted birefringent structure where the total angle of twist is φ and, for incident optical radiation having an in vacuo wavelength (or maximum wavelength) λ, $\Delta n.d \gg \phi\lambda/\pi$, which is known as the Mauguin condition. Polarisation vector rotation is thus performed by the Mauguin effect and is achieved over a relatively wide bandwidth for incident linearly polarised radiation with the polarisation vector parallel or perpendicular to the optic axis of the birefringent material at the face where the radiation enters the material. The Mauguin condition is satisfied most easily for materials or high birefringence, such as liquid crystal material. Also, because liquid crystals orientate in a twisted structure merely by appropriate treatment of alignment surfaces, fabrication of patterned rotators is relatively simple, as described hereinafter.

Figure 2:
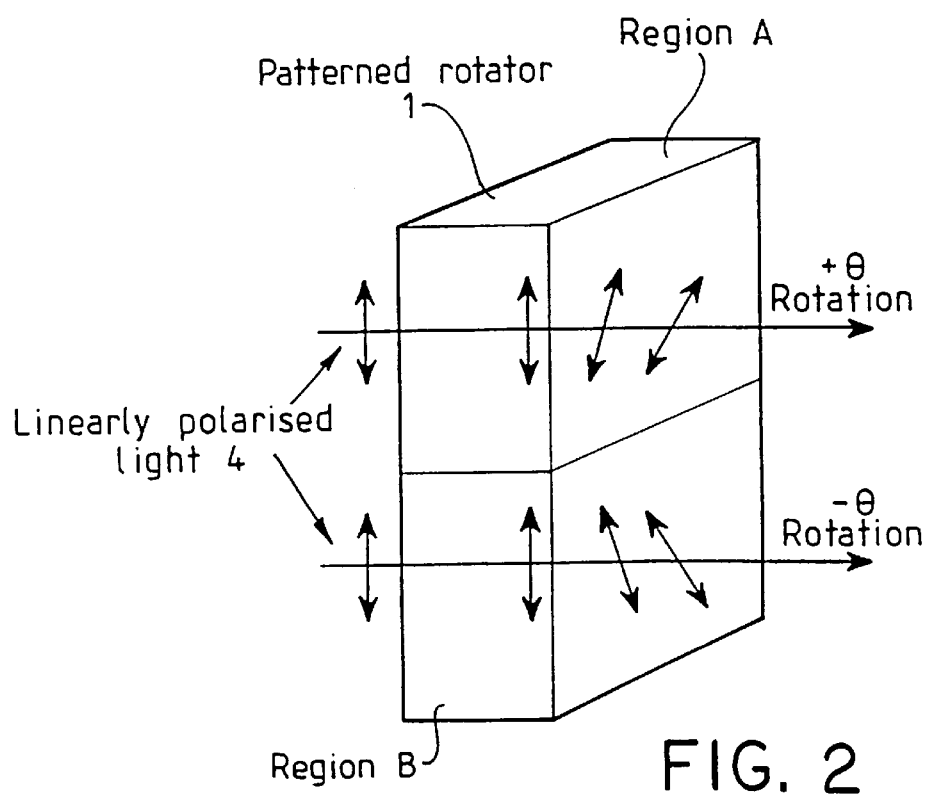
FIG. 2 is a diagrammatic view of an optical element constituting a second embodiment of the invention.

The patterned rotator 1 shown in FIG. 2 differs from that shown in FIG. 1 in that each of the regions A rotates the polarisation vector by an angle of +θ whereas each of the regions B rotates the polarisation vector by an angle of -θ. Such an arrangement may be advantageous in that the operation of the regions A and B is substantially the same so that unwanted optical differences, such as viewing angle variations, may be reduced or avoided.

Figure 3:
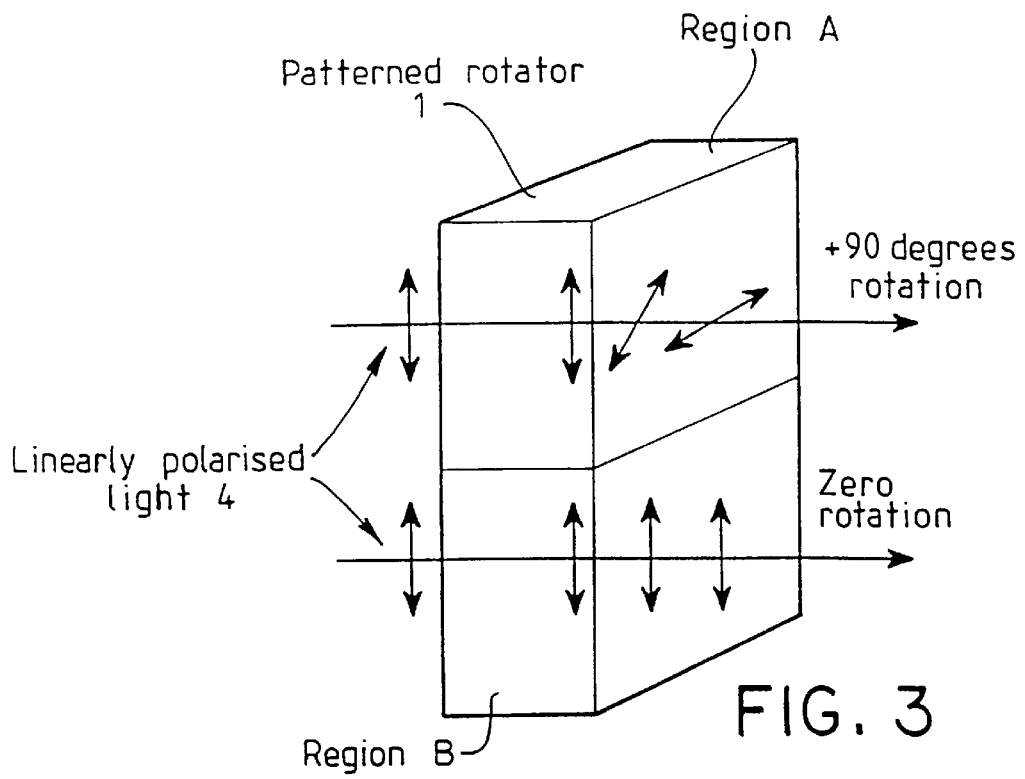
FIG. 3 is diagrammatic view of an optical element constituting a third embodiment of the invention.

The patterned rotator 1 shown in FIG. 3 differs from that shown in FIGS. 1 and 2 in that each of the regions A rotates the polarisation vector by an angle of +90 degrees whereas each of the regions B rotates the polarisation vector by zero angle i.e. provides no or zero rotation. The birefringent material in the regions B of this embodiment is thus untwisted.

Figure 4:
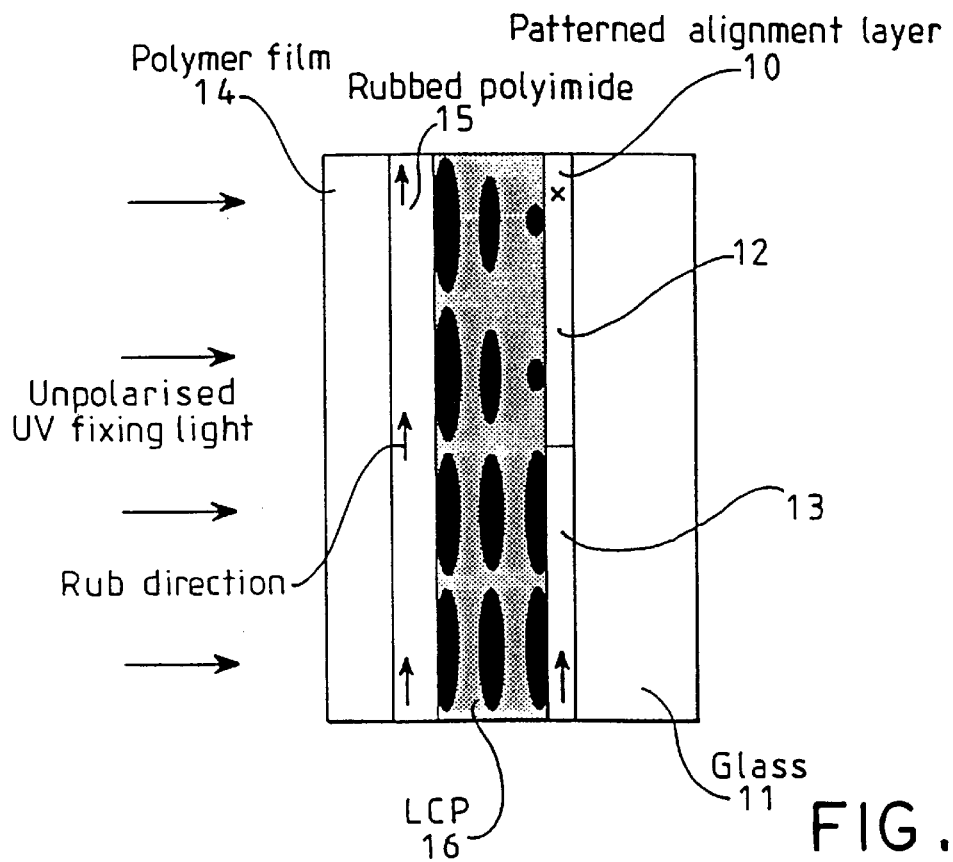
FIG. 4 is a diagrammatic cross sectional view illustrating a method of making an optical element of the type shown in FIG. 3.

The method of making a patterned rotator illustrated in FIG. 4 may be used for any of the rotators 1 shown in FIGS. 1 to 3 but, by way of illustration, is shown for, the rotator of FIG. 3. A patterned alignment layer 10 is formed on a glass substrate 11 such that the alignment direction of a region 12 is perpendicular to the plane of FIG. 4 whereas the alignment direction of a region 13 is in the plane of the drawing. The regions 12 and 13 for forming the regions A and B of the rotator are arranged in a repeating pattern such that the regions 12 and 13 alternate vertically and horizontally. The patterned alignment layer 10 may be formed by spinning a thin layer of polyamide onto the glass substrate 11 and rubbing the surface of the layer 10 through a mask to produce the desired alignment direction patterning. Alternatively, the layer 10 may be formed as a polymer film which has been illuminated by linearly polarised light through suitable masking. Such linearly photopolymerisable (LPP) layers can be made less than 200 nanometers thick and can be patterned easily using lithographic techniques and linearly polarised ultraviolet sources, for instance using the techniques disclosed in M. Schadt et al, "Surface-induced parallel alignment of liquid crystals by linearly polymerised photopolymers", Jpn. J. Appl. Phys 31, 2155, 1992 and in J. L. West et al, "Polarised UV-exposed polyamide films for liquid crystal alignment", SID international symposium digest of technical papers, XXVI, 703, 1995.

A further substrate in the form of a polymer film 14 is provided with a rubbed polyamide alignment layer 15 having a uniform or spatially invariant alignment direction A liquid crystal polymer (LCP) 16 is sandwiched between the alignment layers 10 and 15, which are oriented such that the alignment layers have their alignment directions relatively oriented as desired. In the arrangement shown in FIG. 4, the alignment direction of the layer 15 is parallel to the alignment direction of the regions 13. The alignment layers 10 and 15 thus provide the required liquid crystal twist angle therebetween.

Although a uniform alignment layer 15 is illustrated, it is of course possible to provide a second patterned alignment layer in which alignment varies spatially.

Once the orientation of the LCP 16 has been achieved, this is permanently fixed. For instance, in the case of a LCP which can be fixed by ultraviolet polymerisation or ultraviolet cross linking, this may be achieved by exposure to ultraviolet light. If a LPP film has been used to provide one or both of the alignment layers, it may be necessary temporarily to freeze the liquid crystal alignment by cooling to the glassy state so as to ensure that any change to the LPP on exposure to ultraviolet light for fixing the liquid crystal alignment does not affect the alignment. However, this may not be necessary where the sensitivity of the LPP to ultraviolet light is sufficiently less than that of the ultraviolet polymerisable or cross linkable LCP.

In order to minimise the thickness of the rotator, for instance so as to avoid cross talk between neighbouring pixels when the rotator is used within a LCD, the polymer film and the alignment layer 15 may be removed after fixing of the alignment of the LCP 16. The resulting free surface of the LCP 16 is than suitable for processing substantially in the usual way for LCD fabrication and the glass substrate 11 may form one of the substrates of the display.

Figure 5:
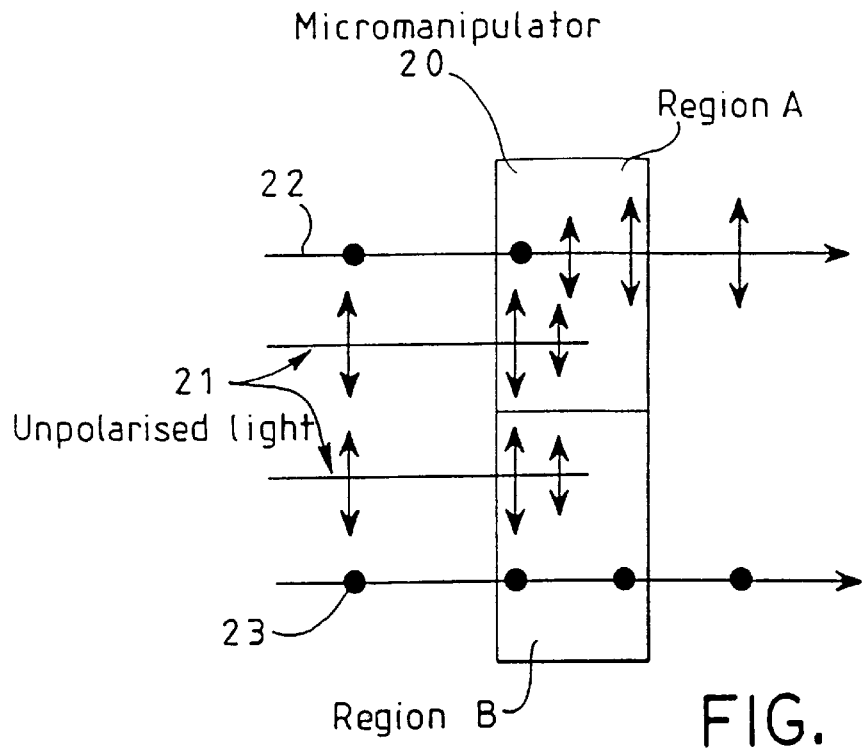
FIG. 5 is a diagrammatic view of an optical element constituting a fourth embodiment of the invention.

By adding anisotropic dye molecules to the polarisation rotators described hereinbefore, it is possible to produce a combined polarisation micromanipulator and such a device is illustrated in FIG. 5. In particular, the micromanipulator 20 of FIG. 5 differs from that of FIG. 3 by performing patterned rotation and polarisation of incoming unpolarised light. The micromanipulator 20 of FIG. 5 may be made by the method illustrated in FIG. 4 merely by adding the anisotropic dye molecules to the LCP 16 before sandwiching between the alignment layers 10 and 15.

Vertically polarised light 21 incident on each of the regions A and B is absorbed. Horizontally polarised light 22 incident on each of the regions A passes through the region and is rotated through an angle determined by the twist of the LCP, for instance by 90 degrees as shown in FIG. 5. Horizontally polarised light 23 incident on each of the regions B is transmitted without rotation of the polarisation vector. Thus, the regions A and B transmit light of orthogonal polarisations although the polarisation state of the transmitted incident light is horizontal for all of the regions.

Figure 6:
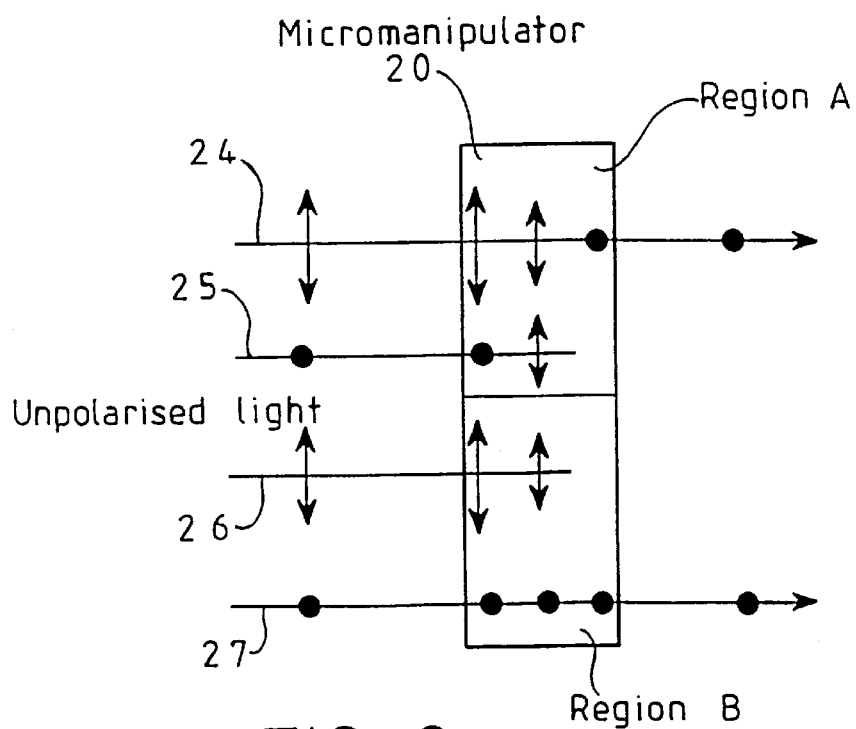
FIG. 6 is a diagrammatic view illustrating an alternating mode of operation of the optical element of FIG. 5.

FIG. 6 shows the result of illuminating the micromanipulator 20 in the opposite direction compared with that illustrated in FIG. 5. In this case, vertically polarised incident light 24 passes through each of the regions A but lids the rotation vector rotated by 90 degrees whereas horizontally polarised light 25 is absorbed. For each of the regions B, vertically polarised light 26 is absorbed whereas horizontally polarised light 27 passes through the region without rotation of the polarisation vector. Thus, output light from the micromanipulator 20 with light passing in the direction shown in FIG. 6 is of uniform polarisation but corresponds to orthogonally polarised input light.

It is possible to fabricate the micromanipulator 20 for use across the whole visible spectrum. For instance, with a guest-host dyed liquid crystal diacrylate monomer with a 2% black dye concentration, it is possible to achieve acceptable polarisation extinction ratios. In particular, at a wavelength of 550 nanometers, a birefringence of 0.2, a layer thickness of 24.7 micrometers and an order parameter of 0.7, the ratio of horizontally polarised light passing through the regions A and B of the micromanipulator 20 shown in FIG. 6 is 1:959 and for vertical polarisation is 569:1. Matched transmission for orthogonal polarisations may be obtained by adding dye to the patterned structure shown in FIG. 2. In particular, for the example given above and for rotation angles θ=±45 degrees, the ratio of the emergent orthogonal polarisations is 872:1 irrespective of whether the incident polarisation is vertical or horizontal.

The micromanipulator 20 may be made in essentially the same way as the patterned rotators 1 as illustrated in FIG. 4. However, to avoid absorption by the dye molecules of the ultraviolet light used for curing the LCP, the ultraviolet light may be linearly polarised and oriented orthogonal to the absorbing direction of the dye molecules, for instance horizontally polarized (polarisation vector perpendicular to the plane of the drawing) in FIG. 4. This is most easily achieved by illuminating through the uniform alignment layer 15 (when present). Guiding of the ultraviolet light due to the Mauguin effect ensures that the whole structure of the ICP is fixed.

If the micromanipulator 20 is to be used inside a LCD, a diffusion barrier layer similar to that used for LCD dye colour filters may be necessary, although the dye molecules are essentially locked into the LCP matrix by the ultraviolet fixing.

Figure 7:
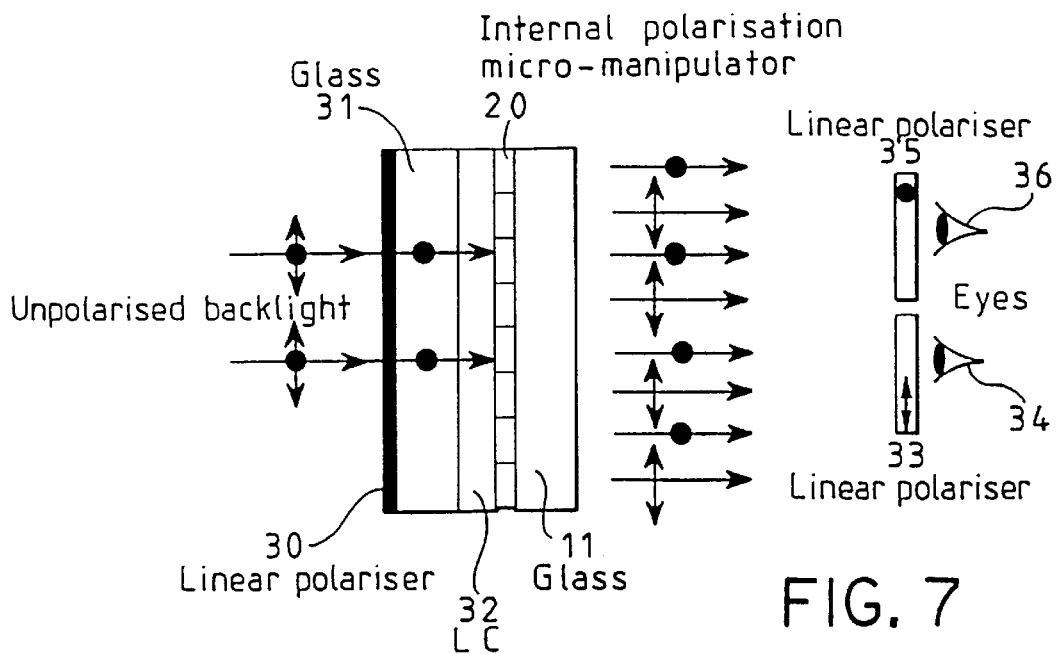
FIG. 7 illustrates a transmissive 3D stereoscopic display using an optical element of the type shown in FIG. 5.

FIG. 7 illustrates use of the micromanipulator 20 of FIG. 5 with an anisotropic device to form a transmissive 3D stereoscopic display. The micromanipulator 20 including the glass substrate 11 forms one surface of the display which further comprises an input linear polariser 30, a further glass substrate 31, and liquid crystal layer 32. The liquid crystal layer 32 includes suitable alignment layers and electrode arrangements (not shown) such that the layer 32 is pixellated with the pixels being aligned with the regions of the micromanipulator 20. The pixels of the liquid crystal layer 32 aligned with the regions A of the micromanipulator 20 display a left eye image of a stereoscopic pair whereas the pixels aligned with the regions B display the right eye image.

In use, a source of unpolarised backlight illuminates the display through the linear polariser 30. The pixels of the liquid crystal layer 32 modulate the transmitted light. The regions A of the micromanipulator 20 rotate the polarisation of output light from the layer 32 such that it is polarised in the plane of FIG. 7 whereas the regions B provide no rotation so that the polarisation vector of light passing therethrough is perpendicular to the plane of FIG. 7.

An observer wears analysing spectacles comprising a linear polariser 33 in front of the left eye 34 and a linear polariser 35 in front of the right eye 36. The linear polarisers 33 and 35 have orthogonal polarisation directions such that the polariser 33 transmits light polarised in the plane of FIG. 7, i.e. from the regions A, while blocking the orthogonally polarised light from the regions B whereas the polariser 35 passes light polarised perpendicularly to the plane of FIG. 7, i.e. from the regions B, but substantially blocks light from the regions A. Thus, the left and right eyes 34 and 36 of the observer see the left and right eye images, respectively, whereas light from the right and left eye images, respectively, is attenuated by the polarisers 33 and 35, respectively, so as to be imperceptible.

Figure 8:
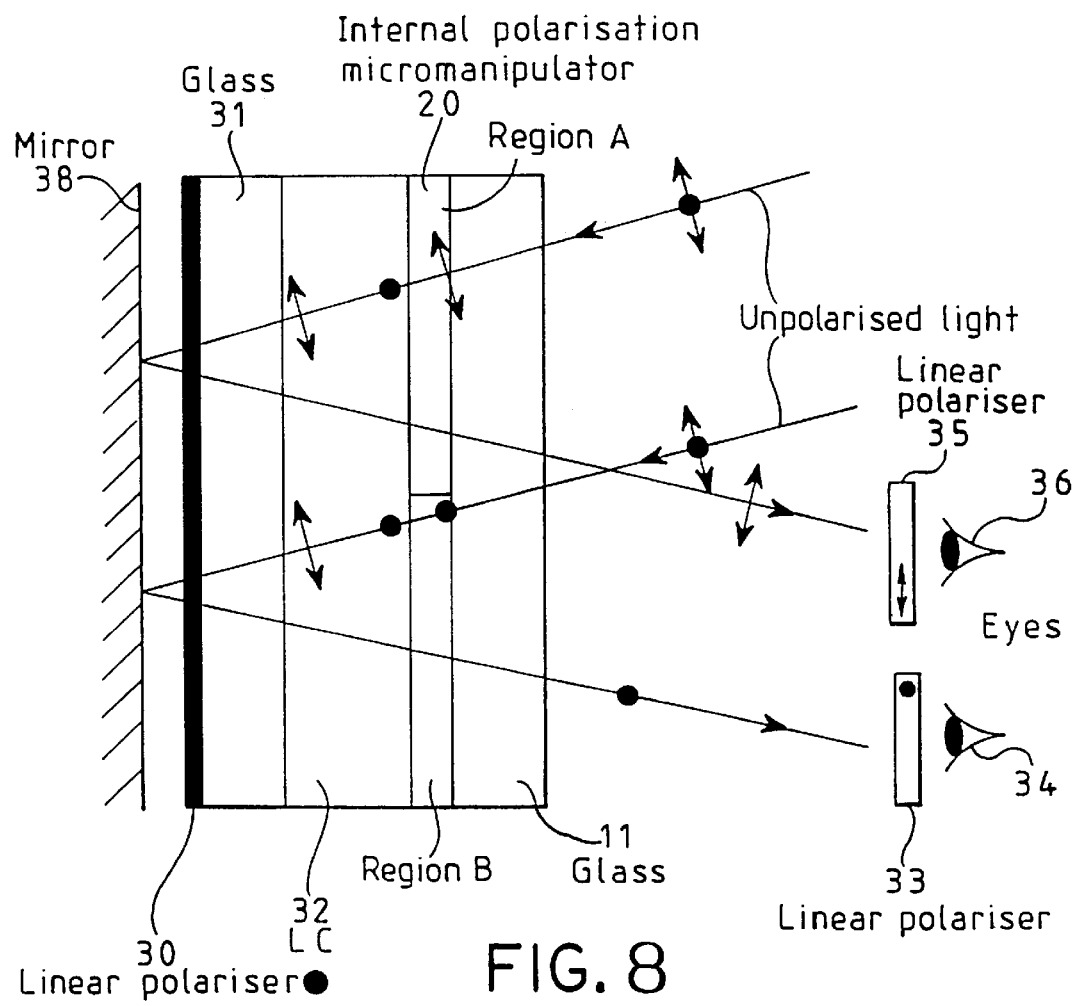
FIG. 8 illustrates a reflective 3D stereoscopic display using an optical element of the type shown in FIG. 5 operating in the mode illustrated in FIG. 6.

The 3D stereoscopic display shown in FIG. 8 differs from that shown in FIG. 7 in that it operates in the reflective mode using unpolarised ambient light. A mirror 38 is disposed behind the linear polariser 30 and the micromanipulator 20 is disposed with the orientation illustrated in FIG. 6.

The regions A block light polarised perpendicular to the plane of the drawing while rotating light polarised parallel to the plane of the drawing. The regions B block light polarised in the plane of the drawing while passing light polarised perpendicular to the plane of the drawing without rotation. Thus, light entering the liquid crystal layer 32 from the micromanipulator 20 is uniformly polarised perpendicular to the plane of the drawing.

With the adjacent pixels of the layer 32 in a first state, light passing through The layer 32 is rotated by 90 degrees, is passed through the linear polariser 30, is reflected by the mirror 38, and passes back through the polariser 30 and the layer 32 with rotation of the polarisation vector. Thus, these pixels appear bright. Pixels in the other state pass the light without rotation of the polarisation vector. Such light is absorbed by the linear polariser 30. The regions A rotate the polarisation vector by 90 degrees whereas the regions B pass the light without rotation of the polarisation vector. Thus, light from the regions A is polarised such that it passes through the linear polariser 35 to the right eye 36 of an observer whereas orthogonally polarised light from the regions B is blocked by the polariser 35. Similarly, light from the regions B passes through the polariser 33 to the eye 34 of the observer whereas orthogonally polarised light from the regions A is blocked by the polariser 33.

Figure 9:
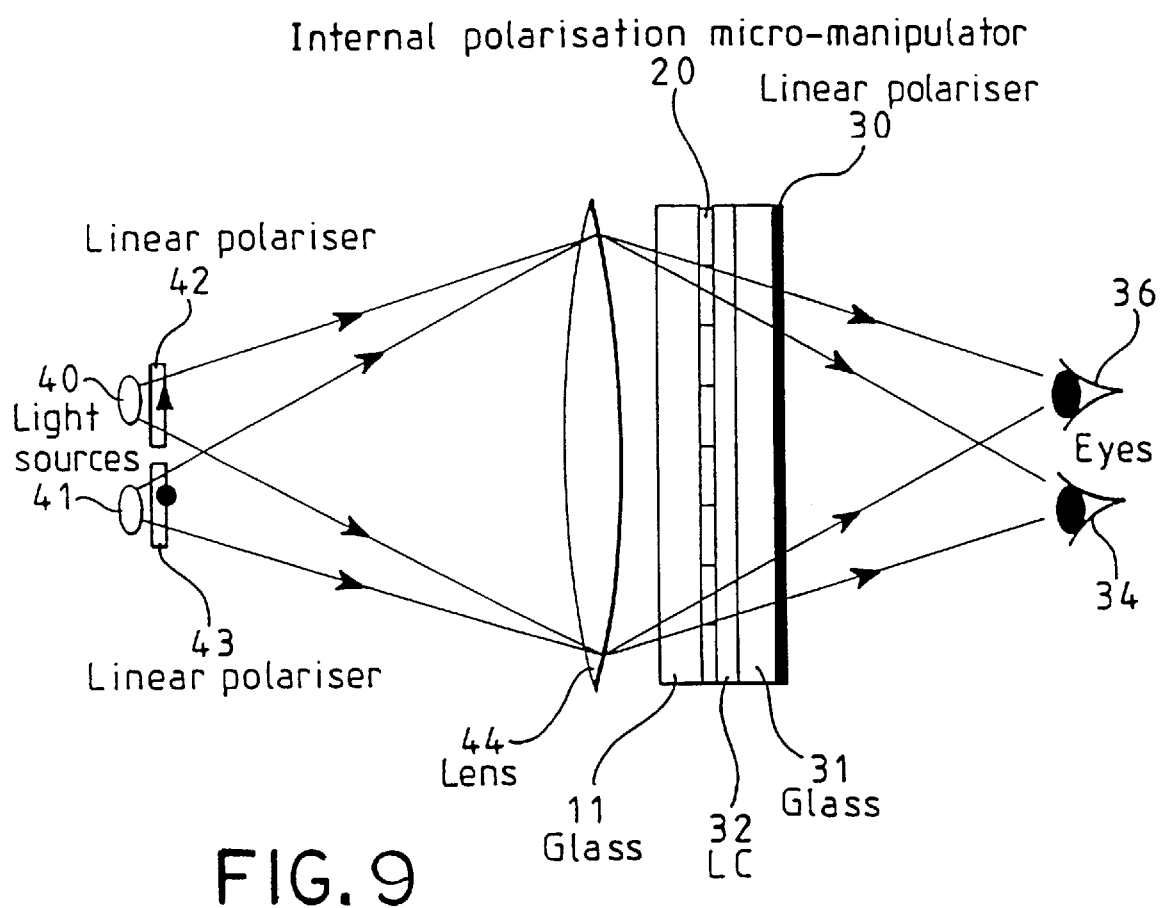
FIG. 9 illustrates a 3D autostereoscopic display using an optical element in the mode illustrated in FIG. 6.

FIG. 9 illustrates a transmissive 3D autostereoscopic display of a type disclosed in EP 0721132. The display of FIG. 9 comprises the glass substrate 11, the micromanipulator 20, the liquid crystal layer 32, the glass substrate 31, and the linear polariser 30 as shown in FIG. 7 but with light passing through this arrangement in the opposite direction, Light sources 40 and 41 are disposed behind linear polarisers 42 and 43, respectively, with orthogonal polarisation directions. A lens 44 images light from the sources 40 and 41 through the display arrangement at viewing windows for the left and right eyes 34 and 36, respectively. The regions A of the micromanipulator 20 pass light from the light source 40 and the linear polariser 42 while substantially blocking light from the light source 41 and linear polariser 43. Conversely, the regions B of the micromanipulator 20 pass light from the light source 41 and the linear polariser 43 while blocking light from the light source 40 and the linear polariser 42. The regions A rotate the polarisation vector of the light from the light source 40 and the linear polariser 42 so that light entering the liquid crystal layer 32 has a constant polarisation vector. The pixels adjacent the regions A of the micromanipulator 20 display a left eye image whereas the regions B display a right eye image. When the eyes 34 and 36 of an observer are located in the left and right viewing windows, respectively, the observer sees a 3D image without having to wear any viewing aids, such as the polarising spectacles comprising the linear polarisers 33 and 35 shown in FIGS. 7 and 8.

Although the elements shown in the accompanying drawings have regions A and B of the same size and shape arranged in a regular pattern, any other desired arrangement may be provided. Thus, the regions A and B can be of different shapes and sizes and may be arranged in any desired pattern in accordance with the application.

For optical elements of the type shown in FIGS. 1 to 3 which do not include the polarisation function, incident light should be polarised with the polarisation vector parallel or perpendicular to the LCP director. In these circumstances, the element functions as a pure rotator of wide bandwidth. Other orientations of the polarisation vector with respect to the LCP director alignment will result in the element displaying retarding effects so that the full advantage of wide optical bandwidth rotation will not be achieved.

It is thus possible to provide an optical element which may be used with an anisotropic optical device whose functionality depends upon the polarisation state of the light with which is illuminated. The use of a thin film optical element which can micro-manipulate the polarisation state of light can improve or extend the applications of such anisotropic devices.

What is claimed is:

1. A patterned polarization-rotating optical element comprising a layer of birefringent material having a thickness d and a birefringence $\Delta n$, wherein the layer comprises at least one first region and at least one second region, at least one of the first and second regions comprising twisted birefringent material having a fixed twist angle φ such that $\Delta n \cdot d >> \phi \cdot \lambda/\pi$, where λ is a wavelength in vacuum of optical radiation, so that the at least one first region provides a first fixed angle of rotation of polarization of light and the at least one second region provides a second fixed angle of rotation of polarization of light, the second angle being different from the first fixed angle.

2. A patterned polarization-rotating optical element as claimed in claim 1 wherein the first fixed angle is substantially equal to 90 degrees.

3. A patterned polarization-rotating optical element as claimed in claim 1, wherein the first fixed angle is substantially equal to +θ degrees and the second angle is substantially equal to −θ degrees.

4. A patterned polarization-rotating optical element as claimed in claim 1, wherein the birefringent material is a liquid crystal polymer.

5. A patterned polarization-rotating optical element as claimed in claim 4, wherein the liquid crystal polymer includes an anisotropic dye.

6. A 3D display including a patterned polarization-rotating optical element as claimed in claim 1.

7. A patterned polarization-rotating optical element comprising a layer of birefringent material having a thickness d and a birefringence Δn,
wherein the layer comprises at least one first region and at least one second region, at least one of the first and second regions comprising twisted birefringent material having a fixed twist angle φ such that $\Delta n \cdot d >> \phi \cdot \lambda/\pi$, where λ is a wavelength in vacuum of optical radiation, so that the at least one first region provides a first fixed angle of rotation of polarization of light and the at least one second region provides a second fixed angle of rotation of polarization of light, the second angle being different from the first fixed angle, and wherein the second fixed angle is substantially equal to zero degrees.

8. A patterned polarization-rotating optical element as claimed in claim 7, wherein the birefringent material is a liquid crystal polymer.

9. A patterned polarization-rotating optical element as claimed in claim 8, wherein the liquid crystal polymer includes an anisotropic dye.

10. A method of making a patterned polarization-rotating optical element comprising the steps of:
forming a layer of birefringent material having a thickness d and a birefringence Δn, the layer comprising at least one first region and at least one second region; and
providing in the birefringent material of the at least one of the first and second regions a fixed twist angle φ such that $\Delta n \cdot d >> \phi \cdot \lambda/\pi$, where λ is a wavelength in vacuum of optical radiation, so that the at least one first region provides a first fixed angle of rotation of polarization of light and the at least one second region provides a second fixed angle of rotation of polarization of light, the second fixed angle being different from the first fixed angle.

11. A method of making a patterned polarization-rotating optical element as claimed in claim 10, further comprising a step of disposing the layer between a first alignment layer and a second alignment layer, the layer including a liquid crystal.

12. A method of making a patterned polarization-rotating optical element as claimed in claim 11, in which the first alignment layer has a uniform alignment direction and the second alignment layer has a spatially varying alignment direction.

13. A method of making a patterned polarization-rotating optical element as claimed in claim 11, further comprising a step of fixing the alignment of the liquid crystal.

14. A method of making a patterned polarization-rotating optical element as claimed in claim 13, further comprising a step of removing at least one of the first alignment layer and the second alignment layer after the step of fixing the alignment of the liquid crystal.

15. A method of making a patterned polarization-rotating optical element as claimed in claim 13, wherein at least one of the first and second alignment layers is a linearly photopolymerisable layer, and the step of fixing the alignment of the liquid crystal is performed by an exposure to light.

16. A method of making a patterned polarization-rotating optical element as claimed in claim 15, wherein the exposure to light comprises an exposure to ultraviolet light.

17. A method of making a patterned polarization-rotating optical element as claimed in claim 15, further comprising the step of cooling the liquid crystal so as to freeze the alignment thereof before the step of fixing the alignment of the liquid crystal.

18. A method of making a patterned polarization-rotating optical element as claimed in claim 15, wherein the liquid crystal includes an anisotropic dye, and the step of fixing the alignment of the liquid crystal includes exposing the liquid crystal to light polarized substantially perpendicularly to a direction of dye molecules of the anisotropic dye.

19. A method of making a patterned polarization-rotating optical element as claimed in claim 11, wherein at least one of the first and second alignment layers is a linearly photopolymerisable layer.

20. A method of making a patterned polarization-rotating optical element as claimed in claim 19, wherein before the step of disposing the liquid crystal between the first and second alignment layers, the linearly photopolymerisable layer is exposed to linearly polarized light.

21. A method of making a patterned polarization-rotating optical element as claimed in claim 20, wherein the linearly polarized light is linearly polarized ultraviolet light.

22. A method of making a patterned polarization-rotating optical element as claimed in claim 11, wherein the liquid crystal includes an anisotropic dye.

23. A patterned polarization-rotating optical element made by a method as claimed in claim 10.

24. A method of making a patterned polarization-rotating optical element comprising the steps of:
forming a layer of birefringent material having a thickness d and a birefringence Δn, the layer comprising at least one first region and at least one second region; and
providing in the birefringent material of the at least one of the first and second regions a fixed twist angle φ such that $\Delta n \cdot d >> \phi \cdot \lambda/\pi$, where λ is a wavelength in vacuum of optical radiation, so that the at least one first region provides a first fixed angle of rotation of polarization of light and the at least one second region provides a second fixed angle of rotation of polarization of light, the second fixed angle being different from the first fixed angle,
wherein the second fixed angle is substantially equal to zero degrees.

* * * * *